(12) United States Patent
Takemura et al.

(10) Patent No.: US 7,356,404 B2
(45) Date of Patent: Apr. 8, 2008

(54) KNOCK DETERMINATION APPARATUS AND METHOD FOR ENGINES

(75) Inventors: Yuichi Takemura, Anjo (JP); Kenji Kasashima, Nishikamo-gun (JP); Rihito Kaneko, Nishikamo-gun (JP)

(73) Assignees: Denso Corporation, Kariya, Aichi-pref. (JP); Toyota Jidosha Kabushiki Kaisha, Toyota, Aichi-pref. (JP)

( * ) Notice: Subject to any disclaimer, the term of this patent is extended or adjusted under 35 U.S.C. 154(b) by 0 days.

(21) Appl. No.: 11/521,379

(22) Filed: Sep. 15, 2006

(65) Prior Publication Data

US 2007/0067091 A1    Mar. 22, 2007

(30) Foreign Application Priority Data

Sep. 16, 2005 (JP) ............................. 2005-270649

(51) Int. Cl.
- *F06F 19/00* (2006.01)
- *G01L 23/22* (2006.01)
- *F02P 5/00* (2006.01)

(52) U.S. Cl. .................. 701/111; 73/35.09; 123/406.34
(58) Field of Classification Search ...................... None
See application file for complete search history.

(56) References Cited

U.S. PATENT DOCUMENTS 4,777,920 A * 10/1988 Oshiage et al. ........ 123/406.37
4,899,711 A * 2/1990 Tabara et al. .......... 123/406.38
4,993,387 A  2/1991 Sakakibara et al. .... 423/406.33
5,188,080 A  2/1993 Sakakibara et al. .... 423/406.38
7,263,430 B2 * 8/2007 Kasashima et al. ......... 701/111

FOREIGN PATENT DOCUMENTS

EP    1416156 A1    5/2004
FR    2721657       12/1995

\* cited by examiner

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

In determining a knock of an engine, a vibration intensity is calculated by logarithm-transforming a peak value or an integral value of an output signal of a knock sensor. Further, a central value VMED of a vibration intensity distribution is calculated, and also a standard deviation $\sigma$ in a region where the vibration intensity is smaller than this central value VMED is calculated. A vibration intensity reference value VIB is calculated as VMED−u×$\sigma$, thereby setting the vibration intensity reference value VIB to be close to a minimum of the vibration intensity distribution. Further, a knock reference value KCK is set by adding a predetermined value K to the vibration intensity reference value VIB. The vibration intensity detected by the knock sensor is compared with the knock reference value KCK to determine presence/absence of a knocking.

8 Claims, 5 Drawing Sheets

KNOCK DETERMINATION APPARATUS AND METHOD FOR ENGINES

CROSS REFERENCE TO RELATED APPLICATION

This application is based on and incorporates herein by reference Japanese Patent Application No. 2005-270649 filed on Sep. 16, 2005.

FIELD OF THE INVENTION

The present invention relates to a knock determination apparatus and method for internal combustion engines, which compares a vibration intensity or magnitude represented by an output signal of a knock sensor with a knock reference value for determining presence/absence of a knocking.

BACKGROUND OF THE INVENTION

As proposed in U.S. Pat. No. 4,993,387 (JP 2605805), for instance, a conventional knock determination apparatus determines a distribution of a value of vibration intensity or magnitude calculated from an output signal of a knock sensor (vibration intensity distribution) and calculates a knock reference value KCK from the vibration intensity distribution. This knock reference value is calculated as shown in (a) of FIG. 6. Specifically, a central value VMED as a statistical index for evaluating the shape of the vibration intensity distribution and a standard deviation $\sigma$ are calculated. The knock reference value KCK is determined by adding a value $3\sigma$, which is three times the standard deviation $\sigma$, to the central value VMED.

$$KCK = VMED + 3\sigma$$

As shown in (b) of FIG. 6, a position of the vibration intensity distribution relative to the vibration intensity varies due to variations in a component such as an engine or a knock sensor. This difference in position is developed as offset. However, the shape of the vibration intensity distribution is maintained as substantially the same, regardless of the variations in the component. As a result, when the knock reference value (KCK=VMED+3$\sigma$) is calculated by using the central value VMED of the vibration intensity distribution as a reference as described above, the knock reference value KCK can be set in such a manner as to eliminate the influence of the variations in the component. This method is advantageous in performing a knock determination without influence of the variations in the component.

On the other hand, as shown in (c) of FIG. 6, in an operating condition where a knocking frequently or recurrently occurs, both the central value VMED of the vibration intensity distribution and the standard deviation $\sigma$ increase resulting in divergence. Therefore, in the operating condition where the knocking frequently occurs, the knock reference value KCK becomes very larger as compared to that at the time of the absence of the knocking. As a result, although the knocking frequently occurs in fact, knocking may not be determined as occurring.

SUMMARY OF THE INVENTION

The present invention has therefore an object of providing a knock determination apparatus for an internal combustion engine, which can accurately detect a knocking even under the condition an offset of the vibration intensity distribution or the divergence of the vibration intensity distribution occurs.

According to one aspect of the present invention, a knock parameter such as knock vibration is detected by a knock sensor. Vibration intensity or magnitude is calculated from an output signal of the knock sensor in a predetermined sample cycle during the operating of an internal combustion engine. A vibration distribution is determined by statistically processing data of the vibration intensity. A vibration intensity reference value is set in a region of the vibration intensity distribution where the vibration intensity is smaller, and also a knock reference value is set by using the vibration intensity reference value. The vibration intensity is compared with the knock reference value for determining presence/absence of a knocking.

Since the vibration intensity of the knocking is greater than a maximum vibration intensity in the vibration intensity distribution at the time of no occurrence of the knocking, the divergence of the vibration intensity distribution generated at the time of the knock occurrence, as shown in FIG. 5($c$), occurs as such a phenomenon as to offset the maximum vibration intensity in the vibration intensity distribution in the direction of increasing it. The minimum vibration intensity of the vibration intensity distribution does not nearly change regardless of the divergence of the vibration intensity distribution. Accordingly, if the vibration intensity reference value is set in a region of the vibration intensity distribution where the vibration intensity is smaller, it is possible to set the vibration intensity reference value in a region where the influence of the divergence of the vibration intensity distribution is small. Therefore, even under the condition the divergence of the vibration intensity distribution occurs, the knock reference value can be set by using the vibration intensity reference value having the smaller influence of the divergence, as reference.

As a result, the knock reference value can be set where the influence of the divergence is smaller, as compared to the conventional method. Thereby, even under the condition the divergence of the vibration intensity distribution occurs, it is possible to set a knock reference value close to the knock reference value at the time of no occurrence of the knocking, making it possible to accurately detect a knocking. In addition, the shape of the vibration intensity distribution is maintained to be generally the same regardless of the variations in the component. Therefore, even if the vibration intensity reference value is set in a region of the vibration intensity distribution where the vibration intensity is smaller, the knock reference value where the influence of the variations in the component is eliminated can be set as similar to a case of using the central value of the vibration intensity distribution as the vibration intensity reference value. As a result, it is possible to make knock determination without the influence of the variations in the component.

In this case, preferably, a value obtained by logarithm-transforming a peak value or an integral value of the output signal of the knock sensor produced during a predetermined knock determination section may be calculated as the vibration intensity. In this way, the vibration intensity distribution at the time of no occurrence of the knocking is a generally normal distribution, making it possible to set a stable knock reference value.

Further, preferably, a central value of the vibration intensity distribution and a variation index (for example, standard deviation) in a region where the vibration intensity is smaller than this central value may be calculated to calculate the vibration intensity reference value may be calculated with the following mathematical expression.

Vibration intensity reference value=central value−(variation index×constant)

Herein it is preferable that the constant is adapted so that the vibration intensity reference value is a value close to the minimum of the vibration intensity distribution. It is considered that the constant may be in general set as three. However, there is a case where it is more preferable to set the constant to a value except for three (for example, 2, 2.5, 3.5, 4 and the like) depending on the shape of the vibration intensity distribution. When the vibration intensity reference value is calculated by the above expression, it is possible to always set the vibration intensity reference value to a value close to the minimum of the vibration intensity distribution, which is the least subject to the influence of the divergence due to frequent occurrence of the knocking. Therefore, accuracy of the knock reference value can be further improved.

Further, a value obtained by adding a predetermined value to the vibration intensity reference value or multiplying a predetermined value over the vibration intensity reference value may be set as the knock reference value.

Knock reference value=vibration intensity reference value+a predetermined value    (1), or Knock reference value=vibration intensity reference value×a predetermined value    (2)

Herein it is preferable that the predetermined value is adapted so that at the time of no occurrence of the knocking, the knock reference value corresponds to a value of "a central value+3σ" (σ: standard deviation). Accordingly, in a case of using the above mathematical expression (1), when the vibration intensity reference value is a value of "a central value−3σ", it is considered that the predetermined value may be preferably adapted to a value of approximately 6σ. However, there is a case where it is more preferable to set the predetermined value to a value except for 6σ (for example, 5σ, 5.5σ, 7σ and the like) depending on a required knock detection performance or the like. When the knock reference value is calculated by the above expression, it is possible to set the knock reference value where the influences of both the variations in the component and the divergence of the vibration intensity distribution at the time of frequent occurrence of the knocking are eliminated as much as possible, with an extremely simple calculation.

According to another aspect of the present invention, a knock parameter related to a knocking of an engine is detected. The intensities of the detected knock parameter are statistically processed and a parameter intensity distribution is determined. A parameter intensity reference value is set to about a minimum parameter intensity of the determined intensity distribution, and a knock reference value is set by adding or multiplying a predetermined value to the set intensity reference value. Presence/absence of a knocking is determined by comparing the intensities of the detected knock parameter with the set knock reference value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
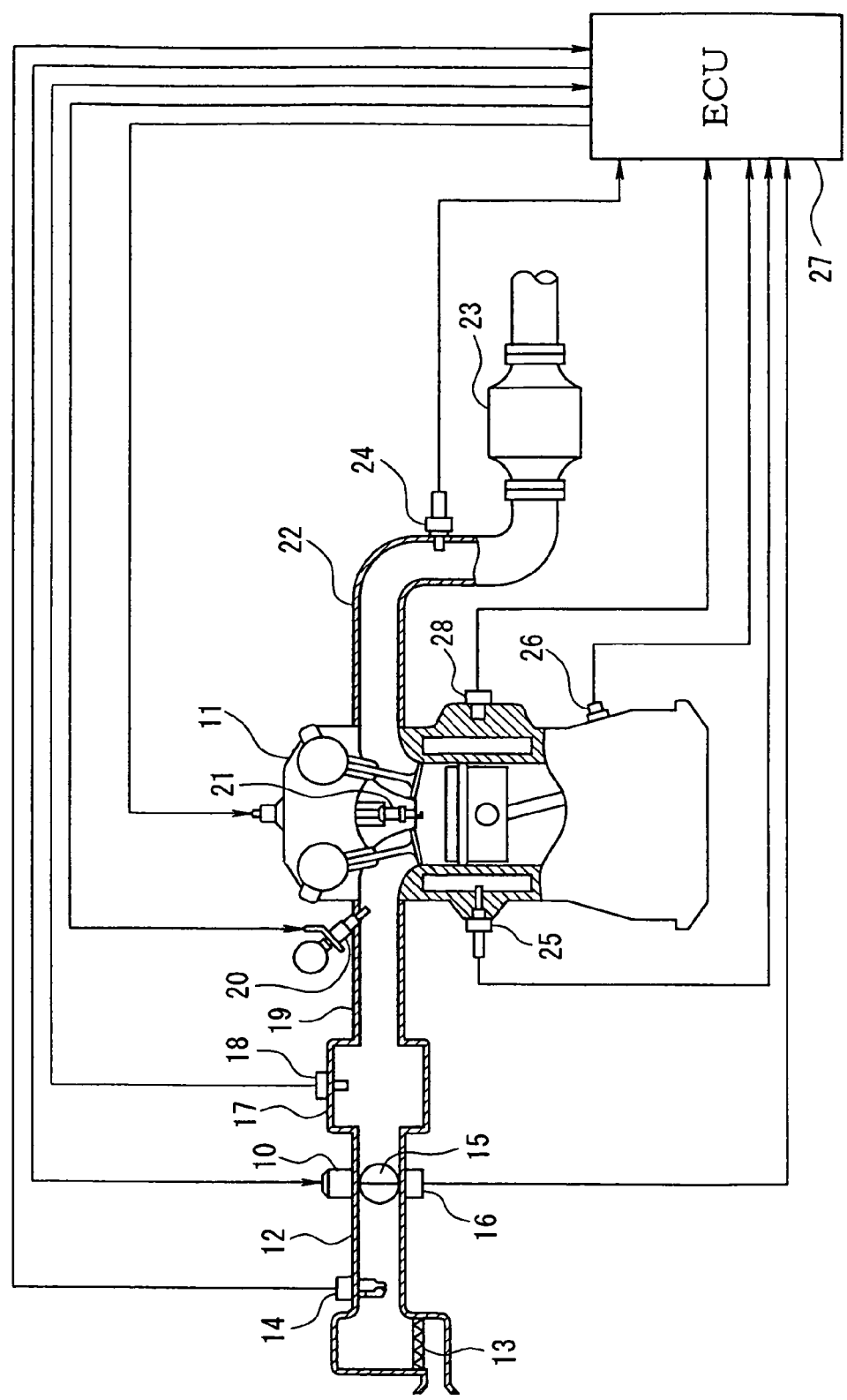
FIG. 1 is a schematic block diagram of an engine control system including a knock determination apparatus according an embodiment of the present invention.

Referring to FIG. 1 showing an engine control system, an air cleaner 13 is located at the most upstream portion of an intake pipe 12 of an internal combustion engine 11. An air flow meter 14 for detecting an intake air quantity is provided at a location downstream of the air cleaner 13. A throttle valve 15 an opening of which is adjusted by an electric motor 10 and a throttle position sensor 16 for detecting a throttle position are provided at a location downstream of the air flow meter 14.

Further, a surge tank 17 is provided at a location downstream of the throttle valve 15 and the surge tank 17 is provided with an intake pipe pressure sensor 18 for detecting an intake pressure in the surge tank 17. Further, the surge tank 17 is connected with each intake manifold 19 for introducing air into each cylinder in the engine 11. A fuel injection valve 20 is mounted to a location close to an intake port of the intake manifold 19 of each cylinder to inject fuel in the intake port. An ignition plug 21 is mounted on a cylinder head of the engine 11 for each cylinder. A mixture in a cylinder is ignited by spark discharge of each ignition plug 21.

On the other hand, a catalyst 23 such as a three-way catalyst for purifying CO, HC, NOx and the like in the exhaust gas is provided in an exhaust pipe 22 of the engine 11. An air-fuel ratio sensor 24 for detecting an air-fuel ratio of the exhaust gas is provided at a location upstream of the catalyst 23. In addition, a cooling water temperature sensor 25 for detecting a cooling water temperature, a knock sensor 28 for detecting a knock vibration as a knock-related parameter and a crank angle sensor 26 for detecting a predetermined angular rotation of a crankshaft of the engine 11 are mounted on a cylinder block of the engine 11. A crank angle or an engine rotational speed is calculated based upon a pulse signal of the crank angle sensor 26.

Outputs of these various sensors are inputted into an electronic control unit (ECU) 27 for the engine 11. This ECU 27 is constructed mainly of a microcomputer and carries out various engine control programs stored in a ROM (storage medium) housed in the ECU 27. Thus, the ECU 27 controls a fuel injection quantity of the fuel injection valve 20 and ignition time point of the ignition plug 21.

Figure 2:
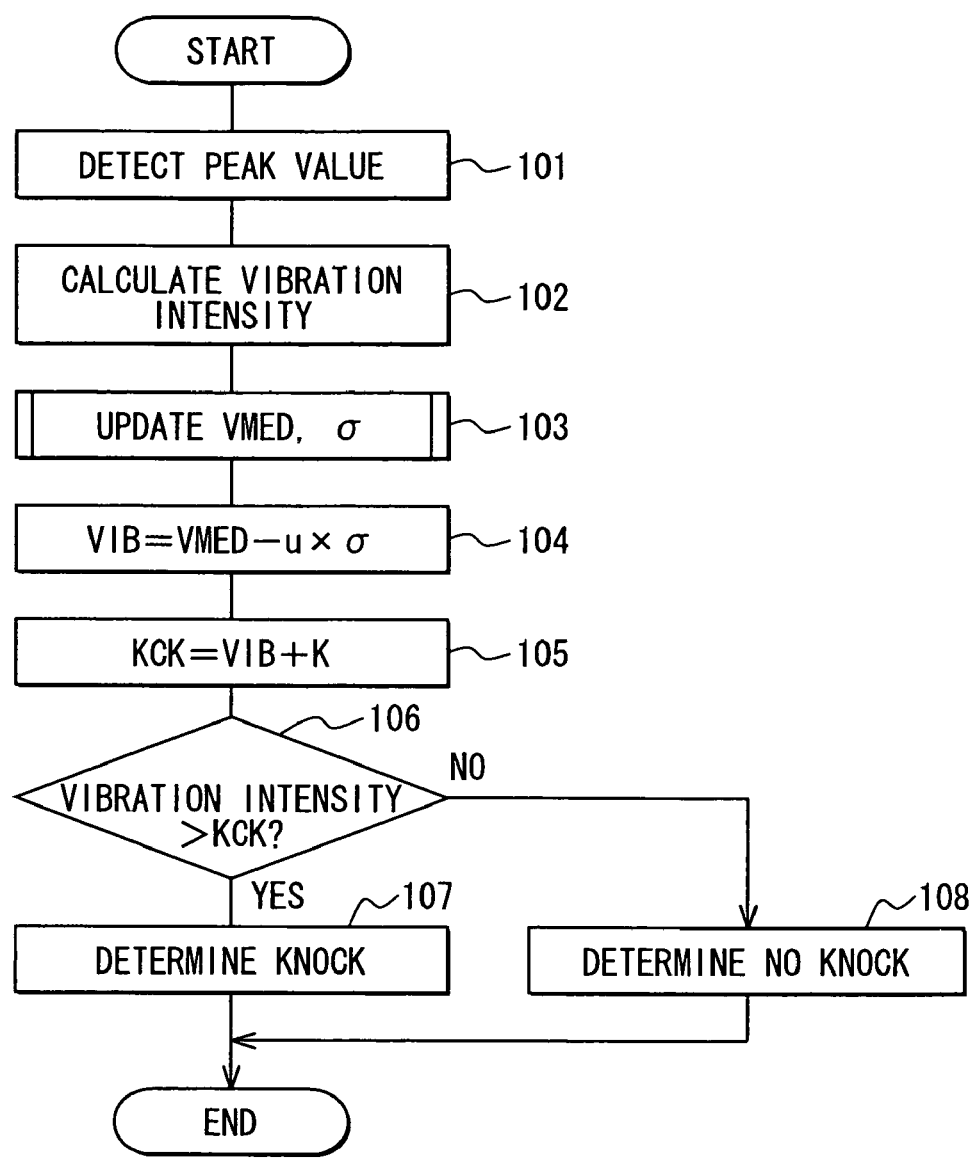
FIG. 2 is a flow chart showing processes of a knock determination routine executed in the embodiment.

Further, the ECU 27 executes a knock determination routine in FIG. 2 to perform knock control as a part of ignition control. A vibration intensity is calculated from an output signal of the knock sensor 28 for each ignition to determine presence/absence of a knocking by comparing the vibration intensity with a knock reference value KCK. When it is determined that the knocking has occurred, the ignition time point is retarded to restrict the knocking. When no knocking continuously occurs, the ignition time point is advanced gradually. With such knock control, the ignition time point is advanced within the range of an acceptable knock sound or the like to improve an engine output and a fuel economy.

As for a method of calculating the vibration intensity, a peak value of the output signal of the knock sensor 28a is subjected to a logarithmic conversion or transformation in a predetermined knock determination section (time period) to obtain a vibration intensity. Alternatively, a value obtained by logarithm-transformation of an integral value of the output signal of the knock sensor 28 in the predetermined knock determination section may be calculated as vibration intensity.

A knock reference value KCK is calculated as follows.

First, data of the vibration intensity is statistically processed to determine the vibration intensity distribution and a vibration intensity reference value VIB is set in a region of the vibration intensity distribution where the vibration intensity is smaller than a predetermined intensity. With respect to the setting of the vibration intensity reference value VIB, a central value VMED of the vibration intensity distribution is calculated by an approximate statistical processing (VEMD and σ update routine in FIG. 3) which will be described later and also a standard deviation σ is calculated as a variation index in a region where the vibration intensity is smaller than the central value VMED. The vibration intensity reference value VIB is calculated as follows.

$$VIB = VMED - u \times \sigma \ (u: \text{``constant''}).$$

Herein, the constant "u" is preferably adapted so that the vibration intensity reference value VIB is a value close to a minimum of the vibration intensity distribution. It is considered that the constant "u" may be preferably set in general as three. However, there is a case where it is more preferable to set the constant "u" to a value except for three (for example, 2, 2.5, 3.5, 4 and the like) depending on the shape of the vibration intensity distribution.

A value obtained by adding a predetermined value K to the vibration intensity reference value (VMED−u×σ) is used as a knock reference value KCK.

$$REF = (VMED - u \times \sigma) + K$$

Herein it is preferable that the predetermined value K is adapted so that at the time of no occurrence of the knocking, the knock reference value KCK corresponds to a value of "VMED+3σ" (or VMED+u×σ). Accordingly, when the vibration intensity reference value VIB is a value of "VMED−3σ", it is considered that the predetermined value K is preferably adapted to a value of approximately 6σ (or 2×u×σ). However, there is a case where it is more preferable to set the predetermined value K to a value except for 6σ (for example, 5σ, 5.5σ, 7σ and the like) depending on a required knock detection performance or the like. It should be noted that a value obtained by multiplying the predetermined value over the vibration intensity reference value (VMED−u×σ) may be used as a knock reference value KCK.

A knock determination of the present embodiment is executed by the ECU 27 as follows according the knock determination routine in FIG. 2. The knock determination routine in FIG. 2 is activated each time the knock determination section (time period) in each cylinder is terminated. When the present routine is activated, first at step S101, a peak value (or integral value) of the output signal of the knock sensor 28 for the predetermined knock determination section is detected. Thereafter, at step S102, a value obtained by logarithm-transforming the peak value (or integral value) is calculated as the vibration intensity. The process at step S102 is thus for vibration intensity calculation.

Figure 3:
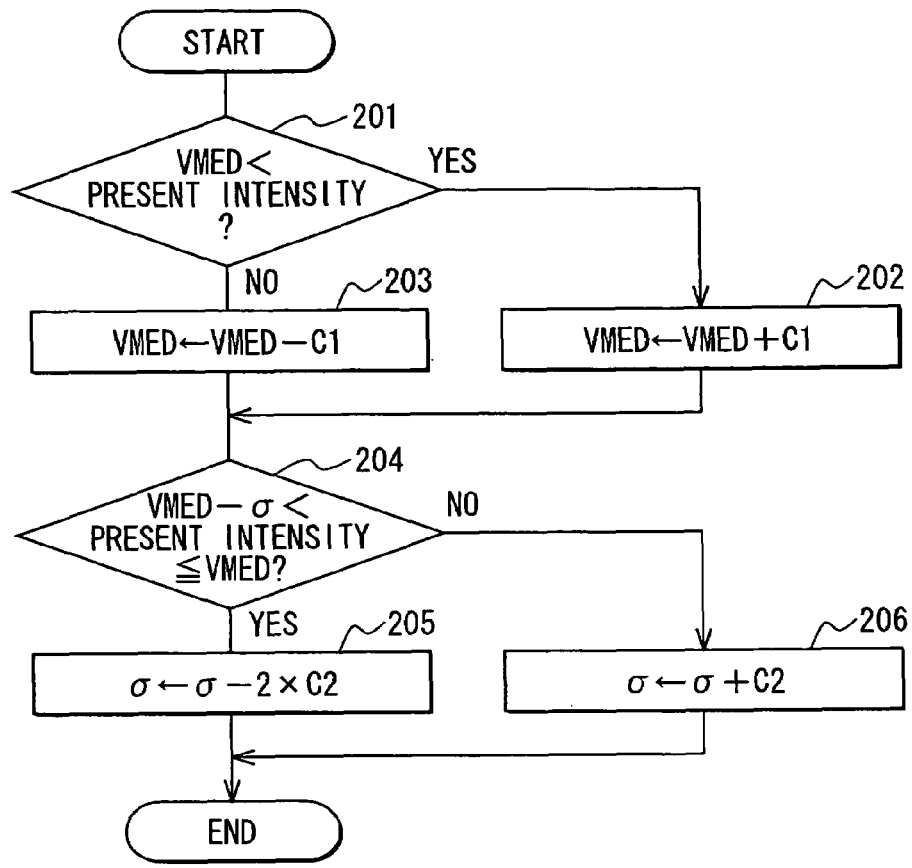
FIG. 3 is a flow chart showing processes of a VMED and a update routine executed in the embodiment.

Thereafter, at step S103, the VEMD and σ update routine in FIG. 3 is executed to calculate the central value VMED of the vibration intensity distribution and the standard deviation "σ" (variation index) in the region where the vibration intensity is smaller than the central value VMED.

Thereafter, at step S104, the vibration intensity reference value VIB is calculated using the central value VMED of the vibration intensity distribution, the standard deviation "σ" and the constant "u" according to the following mathematical expression.

$$VIB = VMED - u \times \sigma$$

Thereafter, at step S105, the value obtained by adding the predetermined value K to the vibration intensity reference value (VMED−u×σ) is used as the knock reference value KCK.

$$KCK = VIB + K$$

The processes at steps S104 and S105 are thus for knock reference value setting.

Thereafter, at step S106, the vibration intensity is compared with the knock reference value KCK. When the vibration intensity is greater than the knock reference value KCK, it is determined at step S107 that the knocking has occurred. When the vibration intensity is less than the knock reference value KCK, it is determined at step S108 that the knocking has not occurred. The processes at steps S106 to S108 are for knock determination.

The VMED and σ update routine in FIG. 3 is a subroutine executed at step S103 in the knock determination routine in FIG. 2. This routine is for vibration distribution determination, which statistically process data of the vibration intensity for determining the vibration intensity distribution. When the present routine is started, first at step S201, the central value VMED of the vibration intensity distribution is compared with the vibration intensity at this time. When the present vibration intensity is greater than the central value VMED of the vibration intensity distribution, at step S202, a value (VMED+C1) obtained by adding a predetermined value C1 to the present central value VMED is set as a new central value VMED. Also when the vibration intensity at this time is less than the central value VMED of the vibration intensity distribution, at step S203, a value (VMED−C1) obtained by subtracting a predetermined value C1 from the present central value VMED is set as a new central value VMED. The central value VMED is thus updated by plus/minus C1 depending on a magnitude relation between the vibration intensity and the central value VMED, thereby quickly converging an updated value of the central value into an appropriate value.

Thereafter, the process goes to step S204, wherein it is determined whether or not the present vibration intensity is within a value from the central value VMED of the vibration intensity distribution to VMED−σ (VMED−σ<vibration intensity≦VMED). When the vibration intensity at this time is within the value from the central value VMED to VMED−σ, at step S205, a value (σ−2×C2) obtained by subtracting two times a predetermined value C2 from the present standard deviation σ is set as a new standard deviation σ. When the present vibration intensity is not within the value from the central value VMED to VMED−σ, at step S206, a value (σ+C 2) obtained by adding a predetermined value C2 from the present standard deviation σ is set as a new standard deviation σ.

Figure 4:
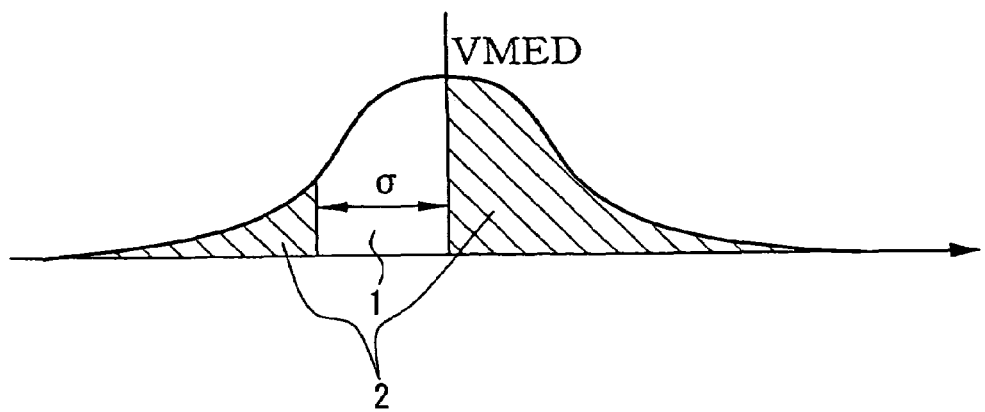
FIG. 4 is a diagram explaining a technical meaning of a standard deviation σ in a region of a vibration intensity distribution where a vibration intensity is smaller than a central value VMED.

That is, as shown in FIG. 4, assuming that the vibration intensity distribution is a normal distribution, a ratio of a frequency (number of times) that the present vibration intensity is within the value from the central value VMED of the vibration intensity distribution to VMED−σ to a frequency that the vibration intensity at this time is within a value other than the above value is 1:2. Therefore, when the vibration intensity at this time is within the value from the central value VMED to VMED−σ, a value (σ−2×C2) is set as a new standard deviation σ. When the vibration intensity at this time is not within the value from the central value VMED to VMED−σ, a value (σ+C2) is set as a new standard deviation σ. These processes are thus repeatedly executed, whereby an update value of the standard deviation σ is substantially equal to a standard deviation in a case of assuming that the vibration intensity distribution becomes the normal distribution.

It should be noted that an initial value of each of the central value VMED and the standard deviation σ may be a preset predetermined value or a learning value (a stored value at the time of the previous engine stopping), or may be zero. In any case, the update value of each of the central value VMED and the standard deviation σ is converged into an appropriate value in about a few seconds after the engine starting.

The vibration intensity of a knocking is greater than the maximum vibration intensity of the vibration intensity distribution at the time of no occurrence of the knocking. Therefore, the divergence of the vibration intensity distribution generated at the time of occurrence of the knocking, as shown in (c) of FIG. 5, occurs as such a phenomenon as to offset the maximum vibration intensity in the vibration intensity distribution in the direction of increasing it. The minimum vibration intensity of the vibration intensity distribution does not nearly change regardless of the divergence of the vibration intensity distribution. Accordingly, if the vibration intensity reference value is set in a region of the vibration intensity distribution where the vibration intensity is smaller, it is possible to set the vibration intensity reference value VIB in a region where the influence of the divergence of the vibration intensity distribution is small. Therefore, even under the condition the divergence of the vibration intensity distribution occurs, the knock reference value KCK can be set by using the vibration intensity reference value VIB having the smaller influence of the divergence as reference.

As a result, in the present embodiment, the knock reference value KCK can be set with less influence of the divergence, as compared to the conventional method of setting the knock reference value KCK by using the central value VMED which has a larger influence of the divergence. Thereby, even under the condition the divergence of the vibration intensity distribution occurs, it is possible to set a knock reference value KCK close to the knock reference value at the time of no occurrence of the knocking, making it possible to accurately detect a knocking.

Figure 5:
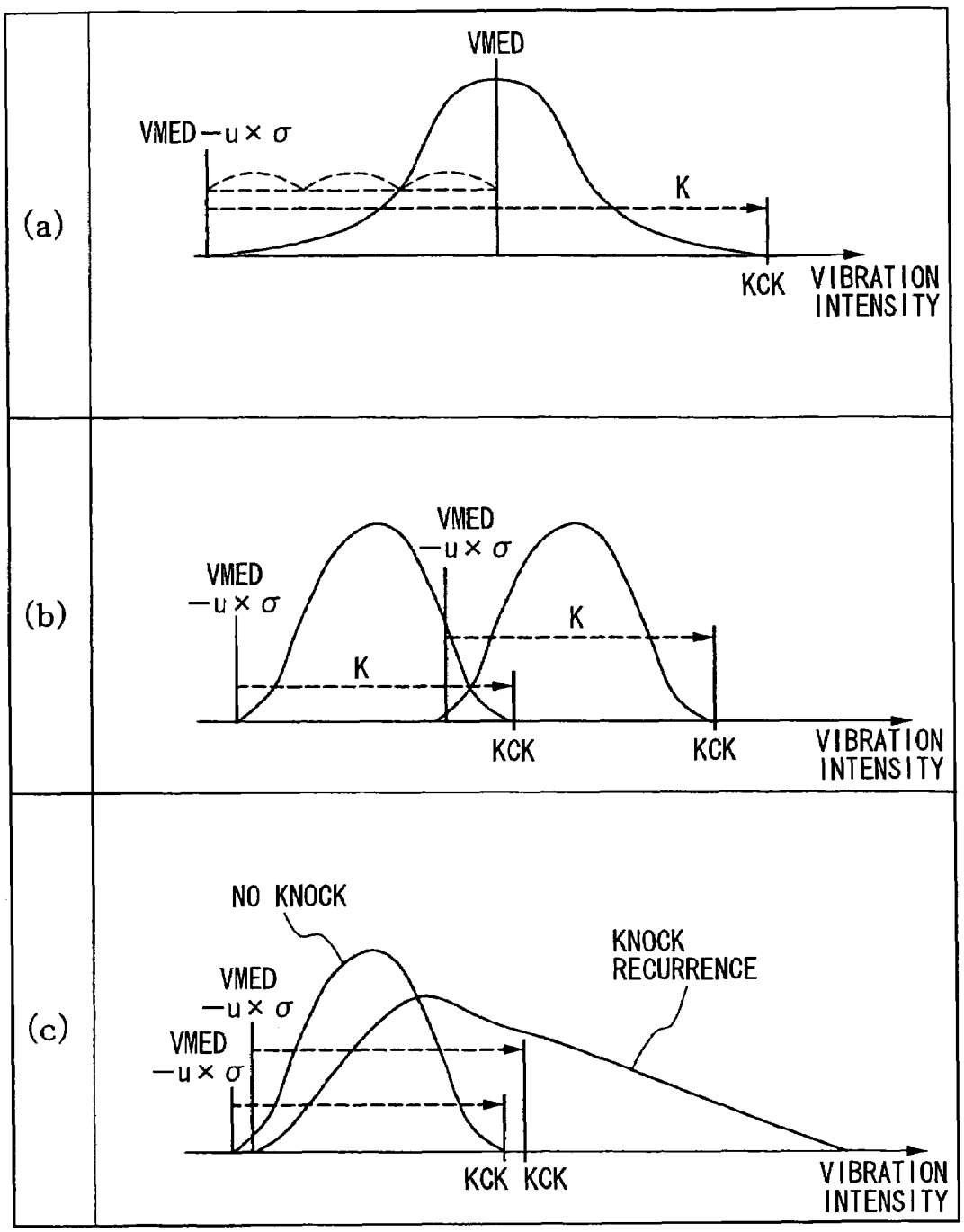
FIG. 5 is a diagram explaining a knock determination method in the embodiment of the present invention.
Figure 6:
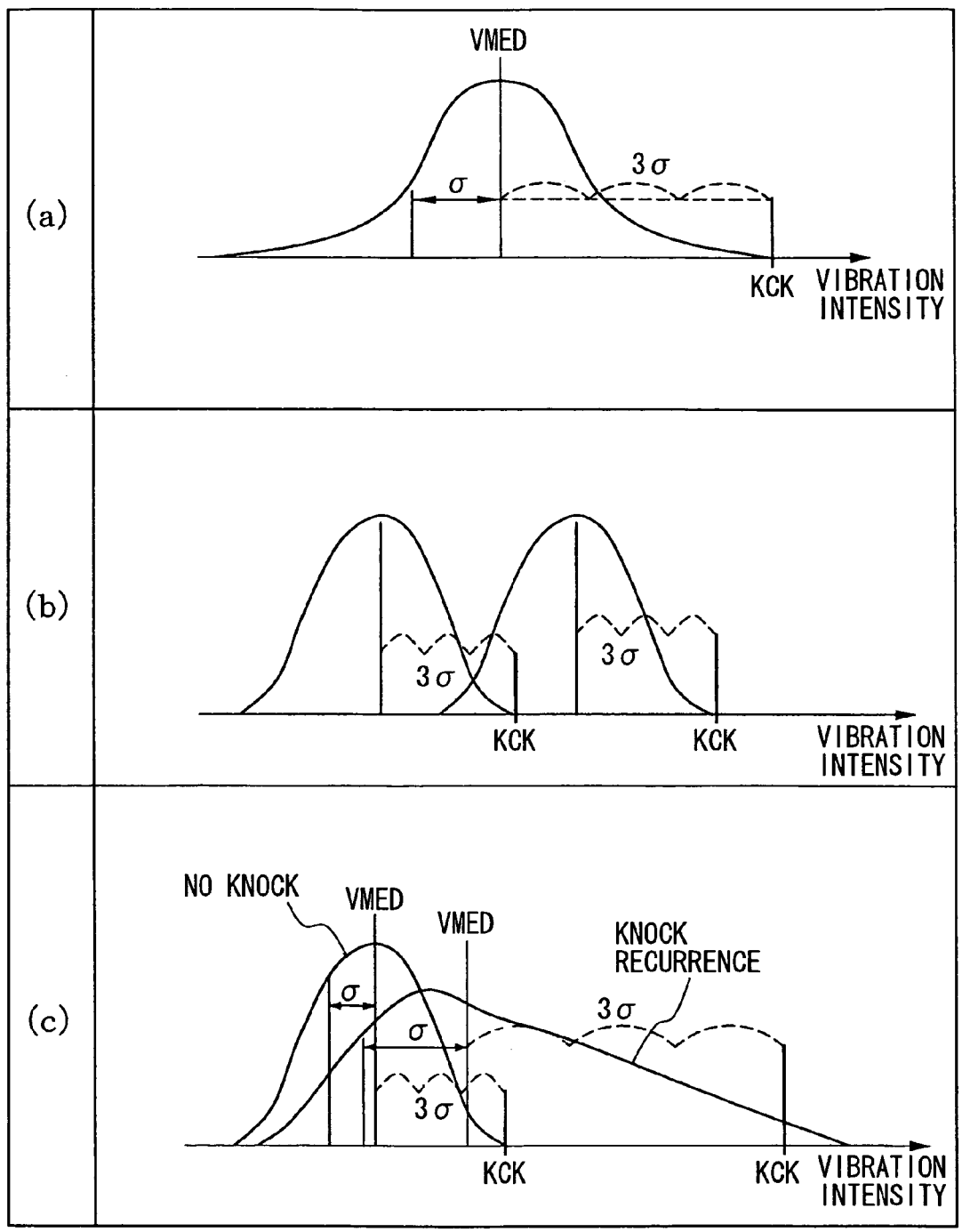
FIG. 6 is a diagram explaining a conventional knock determination method.

In addition, the shape of the vibration intensity distribution is, as shown in (b) of FIG. 5, maintained to be generally the same regardless of the variations in a component of an engine. Therefore, even if the vibration intensity reference value VIB is, as shown in the present embodiment, set in a region of the vibration intensity distribution where the vibration intensity is smaller, a knock reference value KCK where the influence of the variations in the component is eliminated can be set as similar to a case of using the central value VMED of the vibration intensity distribution as the vibration intensity reference value VIB. As a result, it is possible to make the knock determination without the influence of the variations in engine components.

Further, since the central value VMED as the statistical index evaluating the shape of the vibration intensity distribution and the standard deviation σ (variation index) are calculated by the approximate statistical processing (VMED and σ update routine in FIG. 3), the present embodiment has an advantage of speeding up the update speed of the central value VMED of the vibration intensity distribution and the standard deviation σ (variation index), i.e., the update speed of the knock reference value, but the central value VMED of the vibration intensity distribution and the standard deviation σ (variation index) may be calculated by general statistical processing. Also, for example, divergence V ($=\sigma^2$) may be used in place of the standard deviation σ as the variation index.

It should be noted that, in the present embodiment, the knock sensor 28 for detecting vibrations of the cylinder block is used for detecting a knock, but any other sensors, which detects a knock parameter (parameter related to a knock), such as a combustion pressure sensor (in-cylinder sensor) for detecting a combustion pressure may be used.

The invention claimed is:

1. A knock determination apparatus for an internal combustion engine comprising:
    a knock sensor for detecting a knock vibration of the internal combustion engine;
    vibration intensity calculating means for calculating a vibration intensity from an output signal of the knock sensor in a predetermined sample cycle during operation of the internal combustion engine;
    distribution determining means for statistically processing data of the vibration intensity for determining a vibration intensity distribution;
    knock reference value setting means for setting a vibration intensity reference value in a region of the vibration intensity distribution where the vibration intensity is smaller and also a knock reference value by using the vibration intensity reference value as a reference; and
    knock determining means for comparing the vibration intensity with the knock reference value for determining presence/absence of a knocking.

2. The knock determination apparatus according to claim 1,
    wherein the vibration intensity calculating means calculates the vibration intensity by logarithm-transforming a peak value or an integral value of an output signal of the knock sensor during a predetermined knock determination section.

3. The knock determination apparatus according to claim 1,
    wherein the knock reference value setting means calculates a central value of the vibration intensity distribution and a variation index in a region where the vibration intensity is smaller than the central value, and calculates the vibration intensity reference value as:

central value−(variation index×constant).

4. The knock determination apparatus according to claim 1,
    wherein the knock reference value setting means sets the knock reference value by adding a predetermined value to the vibration intensity reference value or multiplying a predetermined value over the vibration intensity reference value.

5. The knock determination apparatus according to claim 1,
    wherein the knock reference value setting part sets the knock reference value by adding a predetermined value to the vibration intensity reference value or multiplying a predetermined value over the vibration intensity reference value.

6. A knock determination apparatus for an internal combustion engine comprising:
   a knock sensor that detects a knock vibration of the internal combustion engine;
   vibration intensity calculating part that calculates a vibration intensity from an output signal of the knock sensor in a predetermined sample cycle during operation of the internal combustion engine;
   distribution determining part that statistically processes data of the vibration intensity for determining a vibration intensity distribution;
   knock reference value setting part that sets a vibration intensity reference value in a region of the vibration intensity distribution where the vibration intensity is smaller and also a knock reference value by using the vibration intensity reference value as a reference; and
   knock determining part that compares the vibration intensity with the knock reference value for determining presence/absence of a knocking.

7. The knock determination apparatus according to claim 6,
   wherein the vibration intensity calculating part calculates the vibration intensity by logarithm-transforming a peak value or an integral value of an output signal of the knock sensor during a predetermined knock determination section.

8. The knock determination apparatus according to claim 6,
   wherein the knock reference value setting part calculates a central value of the vibration intensity distribution and a variation index in a region where the vibration intensity is smaller than the central value, and calculates the vibration intensity reference value as:

central value−(variation index×constant).

* * * * *